US008356131B2

(12) United States Patent
Bolanowski

(10) Patent No.: US 8,356,131 B2
(45) Date of Patent: Jan. 15, 2013

(54) SYSTEM AND METHOD FOR CONTROLLING INTERRUPTION OF A PROCESS IN ELECTRONIC EQUIPMENT BASED ON PRIORITY OF THE PROCESS, AND PROGRAM

(75) Inventor: Wladyslaw Bolanowski, Bara (SE)

(73) Assignee: Sony Mobile Communications AB, Lund (SE)

( * ) Notice: Subject to any disclaimer, the term of this patent is extended or adjusted under 35 U.S.C. 154(b) by 413 days.

(21) Appl. No.: 12/626,264

(22) Filed: Nov. 25, 2009

(65) Prior Publication Data

US 2011/0099313 A1 Apr. 28, 2011

Related U.S. Application Data

(60) Provisional application No. 61/254,746, filed on Oct. 25, 2009, provisional application No. 61/255,047, filed on Oct. 26, 2009.

(51) Int. Cl.
*G06F 9/48* (2006.01)
(52) U.S. Cl. ....................................... 710/264; 710/262
(58) Field of Classification Search .................. 710/260, 710/262, 264; 711/167, 168
See application file for complete search history.

(56) References Cited

U.S. PATENT DOCUMENTS

| 6,292,856 | B1 | 9/2001 | Marcotte |
| 6,389,500 | B1 * | 5/2002 | Lin ............................... 710/302 |
| 7,054,972 | B2 * | 5/2006 | Parry et al. .................... 710/260 |
| 7,281,086 | B1 | 10/2007 | More et al. |
| 7,836,291 | B2 * | 11/2010 | Yim et al. ...................... 710/262 |
| 2011/0004711 | A1 * | 1/2011 | Sjogren et al. .................. 710/67 |

FOREIGN PATENT DOCUMENTS

EP 0 488 501 A2 6/1992

OTHER PUBLICATIONS

International Search Report corresponding to PCT/IB2010/002344, mailed on Jan. 13, 2011.
Written Opinion of the International Searching Authority corresponding to PCT/IB2010/002344, mailed on Jan. 13, 2011.

* cited by examiner

*Primary Examiner* — Glenn A Auve
(74) *Attorney, Agent, or Firm* — Renner, Otto, Boisselle & Sklar, LLP

(57) ABSTRACT

System, method, and program to determine whether to interrupt a process, e.g., a write function, to carry out another process, e.g., a high priority read function, in a device that uses memory devices, e.g., eMMC devices, that use a single channel to carry out two different processes, e.g., write and read processes.

18 Claims, 3 Drawing Sheets

SYSTEM AND METHOD FOR CONTROLLING INTERRUPTION OF A PROCESS IN ELECTRONIC EQUIPMENT BASED ON PRIORITY OF THE PROCESS, AND PROGRAM

CROSS-REFERENCE TO RELATED APPLICATION

This application claims the benefit of U.S. Provisional Patent Application Ser. No. 61/254,746, filed Oct. 25, 2009, and Ser. No. 61/255,047, filed Oct. 26, 2009, and the entire disclosure of which are hereby incorporated by reference.

TECHNICAL FIELD OF THE INVENTION

The technology of the present disclosure relates generally to a system and method for controlling interruption of a process in electronic equipment based on priority of the process. More particularly, the present disclosure relates to control of interruptions in devices and systems that use the same channel for plural processes, e.g., writing and reading, writing and erasing, reading and erasing, and so on, for example, in an embedded Multimedia Cards (eMMC) and so on.

BACKGROUND

Electronic devices store data, which can be either data related to characteristics of a device or executable code required for the execution of functions and/or computer application programs for the device. Such electronic devices use a virtual memory technique to efficiently store and manage data.

In the virtual memory technique, a volatile storage medium and a nonvolatile storage medium are mapped to manage data and code and demand paging is performed to retrieve from the nonvolatile storage medium to the volatile storage medium only data or code that is needed. An example of nonvolatile storage medium is known as flash ram or flash memory (as is well known the acronym RAM refers to random access memory). An example of volatile storage medium may be referred to as relatively high speed RAM or simply as RAM. Both flash ram and RAM may be written to, read, re-written to, erased, and so on, depending, for example, on the nature of the nonvolatile and volatile memory and the electronic equipment and method in which used.

In the mobile environment, a nonvolatile memory (e.g., a Not AND (NAND) flash memory or other flash memory or nonvolatile memory) is a nonvolatile storage medium that functions as a disk of the mobile equipment. The nonvolatile storage medium can store a large capacity of data or code despite its simple structure.

However, with many nonvolatile memory devices, write performance is comparatively slower than a read performance and frequent writes shorten its operational life and, therefore, it is difficult for the mobile environment to utilize the virtual memory technique of the general PC environment. Thus, mobile equipment may apply a demand paging technique of caching only data and code, such as data and code that is in read only region, having no change in the content of RAM.

Demand paging is a method for reading only data or code that is required for a specific process from the nonvolatile storage medium, temporarily downloading the data or code to the physical storage medium, and reading, e.g., using, the data or code from the physical storage medium. In the execution of demand paging, the only information read (e.g., data and/or code) is information that is required for a process and for rapidly processing the information in the volatile storage medium, e.g., a high speed RAM. In other words, demand paging refers to a memory management technique for storing data and code of the device in a physical storage medium and for reading only part of the data or and/or code from the physical storage medium whenever it is needed.

With the development of mobile equipment, more functions are gradually added to the mobile equipment to realize a more convenient mobile environment. Adding more functions to the mobile equipment requires an increase in the amount of software or a demand for RAM. This is followed by an increase in an amount of RAM needed in a device. However, RAM is a relatively expensive resource.

In recent years, a demand for cheap electronic devices is also increasing at the same time. Thus, in order to meet the problem of two conflicting requirements, RAM has to be more efficiently used in order to enable a lesser amount of RAM to be needed.

Another problem in portable electronic device concerns conservation of electrical power, especially as such devices become more complex, capable of more functions, and used for longer periods of time without recharging than in the past. For example, mobile phones are used not only for telephone communications, but also for text messaging, playing of music, video and still photographs, taking of video and photographs, gps functions, and so on.

One approach to conserve energy in mobile electronic equipment has been to use embedded Multimedia Card memory devices (sometimes referred to as eMMC). eMMC devices use the same channel in a write operation or process and in a read operation or process. Thus, both writing and reading cannot be carried out simultaneously.

The prior standard solution for using eMMC memory devices when a there is an ongoing write operation, has been to wait until the write operation has been concluded before permitting a read operation to be requested. It has been proposed to improve the read latency for high priority reads for eMMC devices. One proposal is to allow interrupting an ongoing write operation and thereby shorten the latency for the high priority read. There is a potential problem with this proposal. For example, consider a write operation that has been requested to write the (10) blocks into the embedded memory (eMMC). After writing down four (4) blocks, the operation or process is interrupted by a high priority read operation or process. When the high priority read operation has been concluded, the file system is resuming the write operation in order to write down the remaining six (6) blocks, but then a new high priority read request may arrive, and the write operation again is being interrupted. The default source of high priority read is demand paging, which is a code execution method e.g., as was mentioned above. During startup of the electronic device or when launching a new application, there can be a whole series of page faults that will request high priority read operations. In the foregoing scenario, there may be several seconds delay before the write command can be concluded, thus wasting time and causing frustration to the user.

SUMMARY

Briefly, according to an aspect of the invention, flexible and cumulative timeout duration or time for a write command (as an example of a possibly interruptible command, operation or process) allows the write command to be fully executed when the time out has been reached.

According to another aspect, high priority commands, operations or processes may be permitted to be carried out while interrupting an already commenced command, operation or process, depending on the length of time that the original command, operation or process had been in progress or carried out.

According to another aspect, the invention may be carried out or used in electronic equipment that uses the same circuitry to carry out different commands, operations or processes, e.g., write and read, such that both cannot be carried out simultaneously, such as in eMMC memory devices and so on.

According to another aspect, a system for controlling interruption of an operation to of electronic equipment includes a device configured to carry out an operation, and logic configured to determine based on time consideration permission to interrupt the operation to carry out another operation.

According to another aspect, the device is a mobile phone.

According to another aspect, the permission is based on priority of the operation.

According to another aspect, the logic determines a timeout value [TOUT] and an actual time [TACT] and permits interruption if [TACT] is less than [TOUT].

According to another aspect, the logic does not permit interruption if [TACT] is greater or equal to [TOUT].

According to another aspect, the operation is a write process and the possible interruption is a high priority read process.

According to another aspect, the device uses one channel to carry out both the operation and the another operation.

According to another aspect, the operation and another operation cannot be carried out simultaneously.

According to another aspect, the device is an eMMC device.

According to another aspect, a method for operating electronic equipment by controlling permission to interrupt a process includes determining based on the length of time that the process has been carried out whether to permit interruption of the process to carry out another process.

According to another aspect, the controlling is carried out in a mobile phone.

According to another aspect, the, determining includes determining based on priority.

According to another aspect, the determining includes determining a timeout value [TOUT] and an actual time [TACT] and permitting interruption if [TACT] is less than [TOUT].

According to another aspect the determining does not permit interruption if [TACT] is greater or equal to [TOUT].

According to another aspect the process is a write process and the interruption is a high priority read process.

According to another aspect, one channel is used to carry out both the process and the another process.

According to another aspect, the process and another process are carried out with respect to an eMMC device.

According to another aspect, an electronic device includes a memory configured to store one or more application programs and/or data, a controller coupled to the memory, wherein the processor receives a request to execute a process that may be interruptible depending on priority of the process, the controller is configured to:
  commence carrying out the process,
  in response to an interrupt determining based on time carrying out the process and the time permitted for interrupting the process whether to interrupt the process to carry out another process.

According to another aspect, the device includes a portable electronic device.

According to another aspect, the memory uses the same channel to carry out the process and the another process.

According to another aspect, the process and another process are, respectively, write and high priority read.

According to another aspect, the memory includes an eMMC device.

According to another aspect a program for use in an electronic device for controlling interruption of a computer application program that is stored in a machine readable medium, comprising executable logic to:
  receive a command to launch a routine in a computer application program to carry out the process;
  obtain a timeout time value [tout] within which the process may be interrupted to permit the carrying out of another process;
  after receiving a request for interrupting the process to carry out another process, determining whether the amount of actual time [tact] during which the process has been carried out since commencing carrying out the process is at least one of greater or equal to the timeout time value [tout]; and
  permitting the carrying out of the another process if [tact] is at least one of less than or equal to [tout].

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

The interchangeable terms "electronic equipment" and "electronic device" include general and special purpose computers, portable radio communication equipment and also may include other devices used to take, to record and/or to display photographs or other images. The term "portable radio communication equipment," which hereinafter may be referred to as a "mobile radio terminal," as "portable electronic equipment," or as a "portable communication device,"

includes all equipment such as mobile telephones, pagers, communicators, electronic organizers, personal digital assistants (PDAs), tablets (also sometimes referred to as tablet computers), smartphones, portable communication apparatus or the like.

In the present application, embodiments of the invention are described in the context of a computer and a display associated with a computer. Embodiments also are disclosed in the context of a portable electronic device in the form of a mobile telephone (also referred to as "mobile phone"). However, it will be appreciated that the invention is not intended to be limited to the context of a mobile telephone and may relate to any type of appropriate electronic equipment, examples of which include a media player, a gaming device, a PDA, a computer, digital cameras, other mobile devices capable of showing images, etc.

DETAILED DESCRIPTION OF EMBODIMENTS

Figure 1:
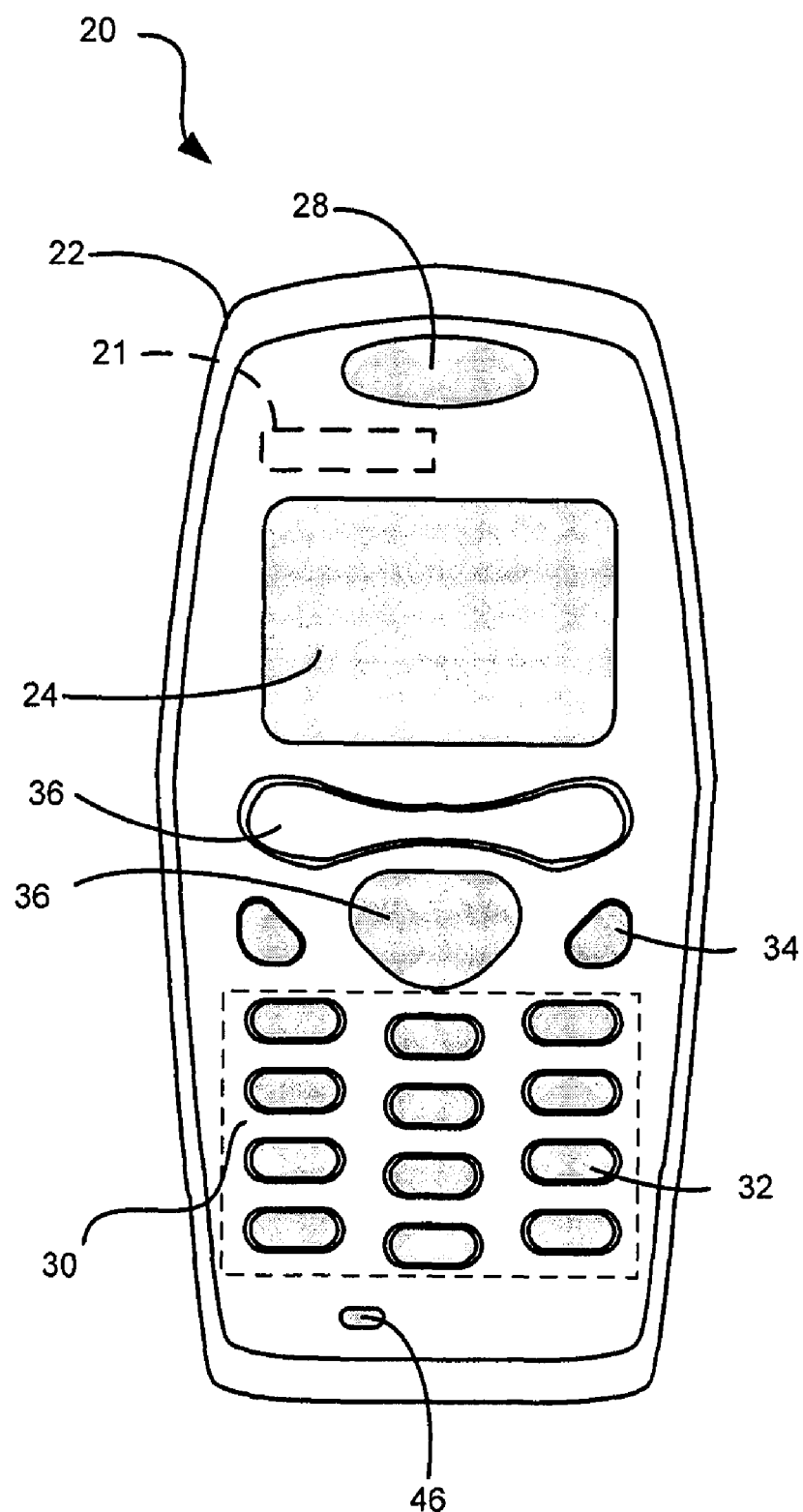
FIG. 1 is an exemplary embodiment of an electronic device in accordance with aspects of the present invention.

Embodiments will now be described with reference to the drawings, wherein like reference numerals are used to refer to like elements throughout. It will be understood that the figures are not necessarily to scale.

Although the invention will be described in connection with a mobile telephone, it will be appreciated that aspects of the disclosed method may be applied to other portable electronic devices such as, but not limited to, cameras, music players, personal digital assistants, other devices mentioned herein, etc.

The present invention is described below with respect to a mobile phone that includes eMMC memory such that only a write operation, function or process (it will be appreciated that the terms command, operation, function and process may be used equivalently to mean the same or essentially the same thing, depending on context) or only a read command, operation, function or process may be carried out at one time. In the description below the write process is considered a process that possibly may be interrupted by an interrupting process, e.g., a high priority read process. However, it will be appreciated that the invention may be used for other processes, one of which is possibly interruptible and the other of which is an interrupting process.

As a brief summary, consider portable electronic equipment, for example, a mobile phone, that uses eMMC memory. Depending on the context, type and priority of a write command, the file system of the operating circuitry of the mobile phone or the application that is requesting the write command finds a proper value for a timeout [TOUT], which is the amount of time within which the write command may be interrupted, e.g., by a high priority read command, such as a high priority read command. For example, on the one hand, for a low priority write command, the value of [TOUT] may be on the order of 500 milliseconds (ms). On the other hand, for an urgent or high priority write command, the [TOUT] value may be on the order of 20 ms. It may be possible that [TOUT] is zero (0). As is described further below, if a high priority read command is received by the operating circuitry of the mobile phone while a write command is in progress, a determination is made whether the high priority read command is permitted to interrupt the write process. As an example, if the write process is of low priority such that it would take only several milliseconds to complete, but [TOUT] is relatively large, e.g., 20 ms., a high priority read command may be permitted to interrupt the write process to carry out the high priority read command; and then the write command would be allowed to continue. As a different example, if the write process is of high priority such that it would take only several milliseconds, to complete, but [TOUT] is relatively small, e.g., 2 ms., a high priority read command that is presented after the [TOUT] time has expired, will not be permitted to interrupt the write command. For very high priority write commands, the time [TOUT] may be set to zero (0) in which case no interruption by a high priority read command would be permitted. As will be appreciated from the description herein, in the case that a high priority read request has been requested while the write operation is still being processed, the invention provides for a negotiation to take place to determine whether the requested high priority read operation will be permitted to be processed or carried out by interrupting the current write process.

Figure 2:
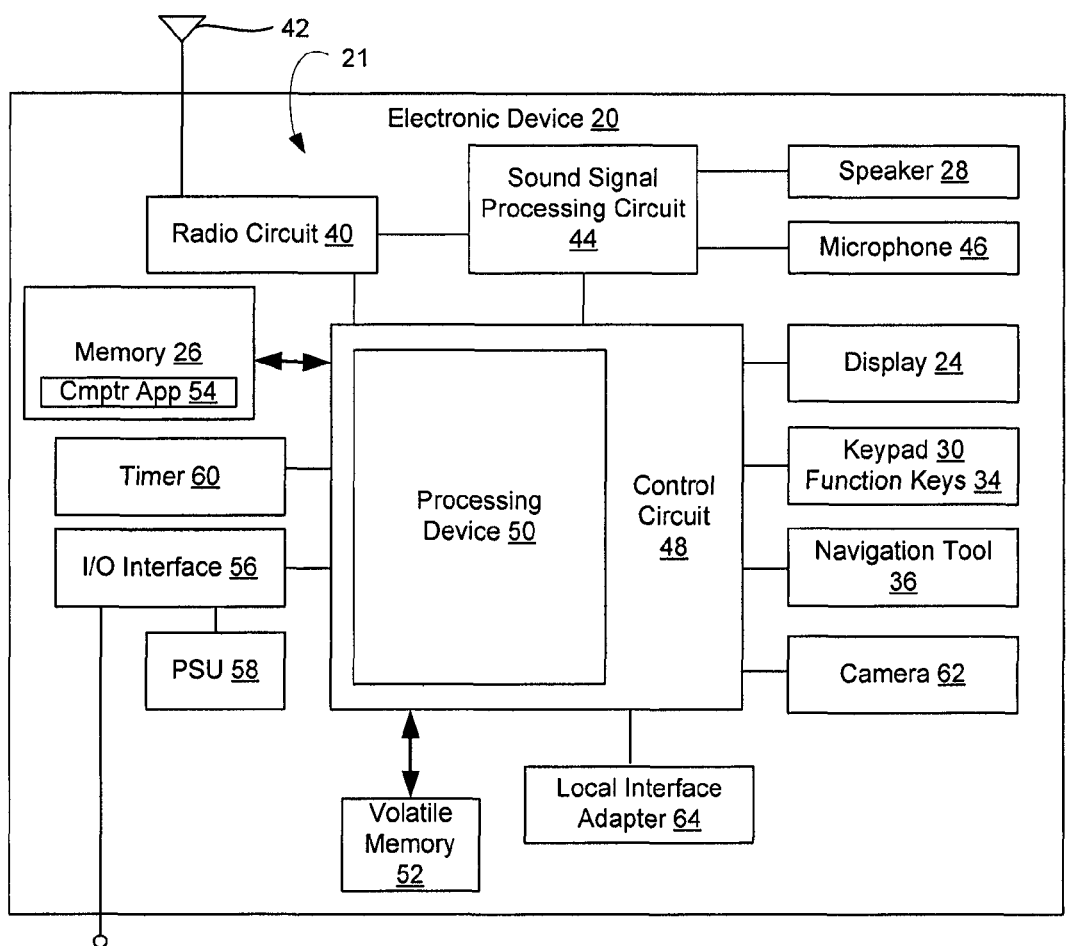
FIG. 2 is a schematic block diagram of the exemplary electronic device of FIG. 2.

Referring initially to FIGS. 1 and 2, an electronic device 20 in the form of a mobile telephone including operating circuitry 21 (shown in greater detail in FIG. 2) is illustrated. The mobile telephone 20 is shown as having a "brick" or "block" design type housing 22, but it will be appreciated that other type housings, such as a clamshell housing or a slide-type housing, may be utilized without departing from the scope of the invention. The mobile telephone 20 includes a display 24. The display 24 displays information to a user such as operating state, time, telephone numbers, contact information, various navigational menus, etc., which enables the user to utilize the various feature of the mobile telephone 20. The display 24 may also be used to visually display content accessible by the mobile telephone 20 from one or more remote sources (e.g., a media server, a network, etc.). The displayed content may include audio and/or video presentations stored locally in nonvolatile memory 26 (FIG. 2) of the mobile telephone 20 operating circuitry 21 and/or stored remotely from the mobile telephone 20 (e.g., on a remote storage device, a media server, remote personal computer, etc.). Such presentations may be derived, for example, from multimedia files, including audio and/or video files, from a received mobile radio and/or television signal, etc. In many situations, the video presentations are accompanied by audio presentations. For example, the displayed video component may be a "music video" and the corresponding audio component may be music intended to be synchronized with the video component. As another example, the displayed video component may correspond to a received mobile television signal and the corresponding audio component may be speech and/or music intended to be synchronized with the video component. The audio component may be broadcast to the user with a speaker 28 of the mobile telephone 20.

The mobile telephone 20 further includes a keypad 30 that provides for a variety of user input operations. For example, the keypad 30 may include alphanumeric keys 32 for allowing entry of alphanumeric information such as telephone numbers, phone lists, contact information, notes, etc. In addition, the keypad 30 typically may include special function keys 34 such as a "call send" key for initiating or answering a call, and a "call end" key for ending, or "hanging up" a call. A navigation tool 36 may also be included to allow the user to easily toggle and or move a cursor on the display and/or for assisting a user to navigate through a menu displayed on the display 24 to select different telephone functions, profiles, settings, etc., as is conventional. Other keys associated with the mobile telephone 20 may include a volume key, audio mute key, an on/off power key, a web browser launch key, a camera key, etc. Keys or key-like functionality may also be embodied as a touch screen associated with the display 24.

The mobile telephone 20 includes conventional call circuitry (e.g., radio circuit 40) that enables the mobile telephone 20 to establish a call and/or exchange signals with a called/calling device, typically another mobile telephone or landline telephone. However, the called/calling device need not be another telephone, but may be some other device such as an Internet web server, content providing server, etc.

Continuing to refer to FIGS. 1 and 2, the mobile telephone 12 includes an antenna 42 coupled to a radio circuit 40. The radio circuit 40 includes a radio frequency transmitter and receiver for transmitting and receiving signals via the antenna 42 as is conventional. The mobile telephone 20 generally utilizes the radio circuit 40 and antenna 42 for voice, Internet and/or E-mail communications over a cellular telephone network. The mobile telephone 20 further includes a sound signal processing circuit 44 for processing the audio signal transmitted by/received from the radio circuit 40. Coupled to the sound processing circuit 44 are the speaker 28 and a microphone 46 that enable a user to listen and speak via the mobile telephone 20 as is conventional. The radio circuit 40 and sound processing circuit 44 are each coupled to the control circuit 48 so as to carry out overall operation.

Referring to FIG. 2, a functional block diagram of the electronic device 20 is illustrated. The mobile telephone 20 operating circuitry 21 includes a primary control circuit 48 that is configured to carry out overall control of the functions and operations of the mobile telephone 20. The control circuit 48 may include a processing device 50, such as a CPU, microcontroller or microprocessor. The processing device 50 executes code stored in a memory (not shown) within the control circuit 48 and/or in a separate memory, such as nonvolatile memory 26 and/or volatile memory 52, in order to carry out conventional operation of the mobile telephone 20. The memory 26 may be, for example, a buffer, a flash memory, a hard drive, a removable media, and/or any type of device that is capable of storing contents when power has been removed from the device. The volatile memory 52 may be, for example, a buffer, RAM or any other source of volatile electronic storage. In addition, the processing device 50 executes code to carry out various functions of the mobile telephone 20.

The nonvolatile memory 26 may include one or more computer application programs 54 for performing one or more tasks or functions. For example, the memory 26 may include one or more programs stored in the memory and may transfer contents to volatile memory 52 when a computer program application is launched to execute the computer application program.

The mobile telephone 20 also includes the aforementioned display 24, keypad 30, function keys 34 and navigation tool 36 coupled to the control circuit 48. The mobile telephone 20 further includes an I/O interface 56. The I/O interface 56 may be in the form of typical mobile telephone I/O interfaces, such as a multi-element connector at the base of the mobile telephone 20. As is typical, the I/O interface 56 may be used to couple the mobile telephone 20 to a battery charger to charge a power supply unit (PSU) 58 within the mobile telephone 20. In addition, or in the alternative, the I/O interface 56 may serve to connect the mobile telephone 20 to a wired personal hands-free adaptor, to an external electronic device (e.g., personal computer or other device) via a data cable, etc. For example, the I/O interface 56 may be a universal port that may be coupled to a cable to connect the mobile telephone 20 to a personal computer. The universal port may be a universal serial bus (USB) port, which receives a USB cable for connection to a USB port of a personal computer.

The mobile telephone 20 may also include a clock or timer 60 for carrying out timing functions. Such functions may include timing the durations of calls, generating the content of time and date stamps, etc.

The mobile telephone 20 may include various built-in accessories, such as a camera 62 for taking digital pictures. Image files corresponding to the pictures may be stored in the memory 26. In one embodiment, the mobile telephone 20 also may include a position data receiver (not shown), such as a global positioning satellite (GPS) receiver, Galileo satellite system receiver or the like.

To establish wireless communication with other locally positioned devices, such as a headset, another mobile telephone, a computer, etc., the mobile telephone 20 may include a local wireless interface adapter 64, such as a Bluetooth adaptor, infrared adapter, near field communication adapter, etc. The wireless interface adapter 64 will generally enable the mobile telephone 20 to communicate with a variety of electronic devices.

Figure 3:
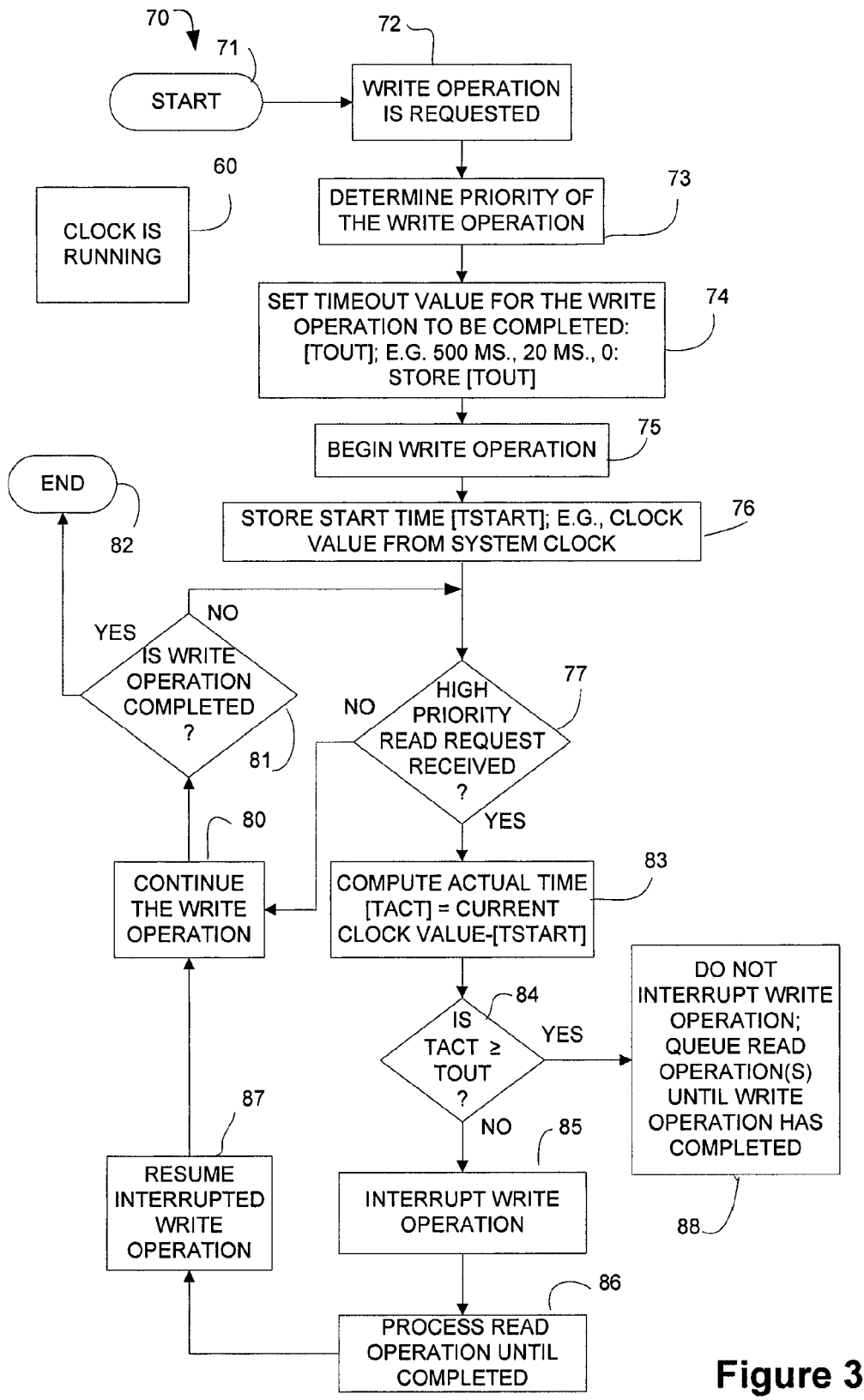
FIG. 3 is a flow chart or logic diagram of an exemplary method carrying out the method of the invention and of exemplary functions of the apparatus and program in accordance with aspects of the present invention.

Turning to FIG. 3, methods for carrying out the invention will be discussed below with reference to the logic diagram or flow chart shown therein.

As will be appreciated, the invention applies to interruptible processes, functions, commands or operations, e.g., write operation (including write operations generally and also reliable write operations in which ORIGINAL data is saved until the write operation has been concluded), erase operation, trim operation, for example, which informs a memory about which blocks should be marked as logically erased and later the memory itself can erase those blocks in background, and so on, that are requested. Not all functions are interruptible, e.g., a read function usually is not interruptible.

The invention may be used according to eMMC interface applications and/or for memories and other devices that do not have two different channels, one for writing and one for reading. The invention avoids conflicts when high priority reading is requested while writing is being carried out and avoids corruption of data, lock up, etc., for such "one channel" devices.

The invention provides flexibility in that can set the timeout [TOUT] depending on the priority of the commands, e.g., depending on the context of the particular write command that is being used, etc. There is a possibility to use process priority. In operating systems a priority is given by the operating system for each process that is executing code. There is the possibility to classify by the priority of the process, e.g., how urgent is it or how short the time [TOUT] out should be. Thus, process priority may determine the value of the timeout [TOUT].

Priority may be based on the operating system of the device or may be a priority that is set in the routine, e.g., the software, instructions, etc., itself. For example, the operating system may assign priority to each process that it executes. Alternatively, the priority may be set more individually in the process itself separately from the operating system. The priority determines the value of [TOUT].

In the majority of operating systems there are just a few priorities, e.g., high priority (small [TOUT] value) for system based operations and low priority (large [TOUT] value) for relatively non-critical operations. There may be a case that the write command should not be interruptible at all. An example of a high priority process is operation of communication drivers in which timing may be rather critical. Such processes are quite critical timing processes, and, therefore, it may be undesirable to interrupt them. In general, there may be several priorities or classes of priorities, for example, critical, high, medium, and low and none; and there may be more or fewer priorities or classes of them.

In FIG. 3 the logic diagram of computer program flow chart 70 is illustrated as an example of a method for carrying out the invention and the operational interaction and characterization of the parts and functions of the invention. The several blocks illustrated in FIG. 3 will be referred to as blocks, steps or functions, which depending on context mean the same.

At block 71 the routine of flow chart 70 is started, e.g., in response to a write command, process, function or operation being requested in the mobile phone 20, as is represented at block 72. At block 73 the priority of the write operation is determined, e.g., is it a critical operation having high priority and low or zero [TOUT] value, or some other priority with a corresponding timeout value [TOUT]. At block 74 the timeout value [TOUT] is set and stored for subsequent use. The timeout value for the write operation is the time in which desirably maximum time within which the write operation is to be completed. It is possible that the timeout time or value [TOUT] is longer, even much longer than the time it actually would take for the write operation to be completed; in such case it is likely that a high priority read operation would be permitted to interrupt the write operation. It is possible that the timeout time is very short, even shorter than the time it actually would take for the write operation to be completed; and in such case it is likely that a high priority read operation would not be permitted to interrupt the carrying out of the write operation unless the high priority read operation were requested very quickly after the write command has been initiated, e.g., within the short [TOUT] time. It is possible that the timeout time is zero, and in this case a high priority read operation would not be permitted to interrupt the carrying out of the write operation.

At block 75 the write operation begins.

At block 76 the start time [TSTART] is obtained and stored. The start time [TSTART] is obtained from the clock value from the system clock 60, for example, from some other counting or clock type device.

At block 77 a decision block provides an inquiry as to whether a high priority read request has been received. The read request is referred to as being a high priority read request as compared to a low priority read request, as, depending on the system in which the invention is used, because a low priority read request will not interrupt a writing process. If the answer at block 77 is "NO," then the logic flows in a loop to block 80 to continue the write operation. At block 81 another decision block provides an inquiry whether the write operation is completed. If "YES," then the routine ends at 82. If "NO," then the loop according to the example presented in the drawing figure continues back to block 77, described just above. It will be appreciated that the decisions, functions and loop that are described with regard to the logic diagram 70 of FIG. 3 are presented by way of examples to facilitate describing the invention. Other types of steps, functions, routines, inputs, interruptions and so on may be used in carrying out the invention as will be appreciated by persons having ordinary skill in the art from the description herein.

If at block 77 a high priority request has been received, then at block 83 the actual time [TACT] is obtained. The actual time value [TACT] may be computed by subtracting the value [TSTART] (see above) from the current clock value (or count). Thus,

[TACT]=CURRENT CLOCK VALUE−[TSTART].

At decision block 84 an inquiry is made whether [TACT] is greater or equal to [TOUT]. Thus, has the actual time [TACT] equaled or exceeded the timeout value [TOUT]. If the answer is "NO," then at block 85 the write operation is interrupted, and at block 86 the high priority read operation is carried out until it is completed. Then, the logic flows to block 87 to resume the interrupted write operation and from there to block 80 to continue the write operation, as was described above.

If the inquiry at decision block 84 answers "YES," then, as is shown at block 88, the write operation is not interrupted; and the high priority read operation is placed in a queue to be carried out after the write operation has been carried out to completion. It is possible that additional high priority read operations may be received as is represented at block 88; those additional high priority read operations may be placed in a queue to be carried out later after the write operation has been completed.

It will be apparent to a person having ordinary skill in the art of computer programming, and specifically in application programming for camera, mobile telephones and/or other electronic devices, how to program the electronic device 20 to operate and carry out usual logical functions associated with the electronic device and the functions and operation described above with respect to the logic diagram 70 illustrated in FIG. 3. Accordingly, details as to specific programming code have been left out for the sake of brevity. Also, while the functions and may be executed by respective processing devices in accordance with an embodiment, such functionality could also be carried out via dedicated hardware or firmware, or some combination of hardware, firmware and/or software.

Although certain embodiments have been shown and described, it is understood that equivalents and modifications falling within the scope of the appended claims will occur to others who are skilled in the art upon the reading and understanding of this specification.

What is claimed is:

1. A system for controlling interruption of an operation of electronic equipment, comprising
    a device configured to carry out an operation, and
    logic configured to determine based on time consideration permission to interrupt the operation to carry out another operation,
    wherein the logic determines a timeout value [TOUT] and an actual time [TACT] and permits interruption if [TACT] is less than [TOUT], and
    wherein the permission is based on priority of the operation.

2. The system of claim 1, wherein the device is a mobile phone.

3. The system of claim 1, wherein the logic does not permit interruption if [TACT] is greater or equal to [TOUT].

4. The system of claim 1, wherein the operation is a write process and the possible interruption is a high priority read process.

5. The system of claim 1, wherein the device uses one channel to carry out both the operation and the another operation.

6. The system of claim 1, wherein the operation and another operation cannot be carried out simultaneously.

7. The system of claim 1, wherein the device is an eMMC device.

8. A method for operating electronic equipment by controlling permission to interrupt a process, comprising
determining based on a length of time that the process has been carried out whether to permit interruption of the process to carry out another process, said determining comprising determining a timeout value [TOUT] and an actual time [TACT] and permitting interruption if [TACT] is less than [TOUT], said determining comprising determining based on priority.

9. The method of claim 8, comprising carrying out the controlling in a mobile phone.

10. The method of claim 8, wherein said determining does not permit interruption if [TACT] is greater or equal to [TOUT].

11. The method of claim 8, wherein the process is a write process and the interruption is a high priority read process.

12. The method of claim 8, wherein one channel is used to carry out both the process and the another process.

13. The method of claim 8, wherein the process and another process are carried out with respect to an eMMC device.

14. An electronic device comprising:
a memory configured to store one or more application programs and/or data,
a controller coupled to the memory, wherein the controller receives a request to execute a process that may be interruptible depending on priority of the process, the controller is configured to:
commence carrying out the process,
in response to an interrupt, determining, based on a time during which the controller has been carrying out the process and a time permitted for interrupting the process, whether to interrupt the process to carry out another process,
wherein the device comprises a portable electronic device.

15. The device of claim 14, wherein the memory uses the same channel to carry out the process and the another process.

16. The device of claim 14, wherein the process and another process are, respectively, write and high priority read.

17. The device of claim 14, wherein the memory comprises an eMMC device.

18. A non-transitory machine readable medium having stored therein a program for use in an electronic device for controlling interruption of a process the program comprising executable logic configured to:
receive a command to launch a computer application program to carry out the process;
obtain a timeout time value [tout] within which the process may be interrupted to permit the carrying out of another process;
after receiving a request for interrupting the process to carry out the another process, determining whether the amount of actual time [tact] during which the process has been carried out since commencing carrying out the process is at least one of greater or equal to the timeout time value [tout]; and
permitting the carrying out of the another process if [tact] is at least one of less than or equal to [tout], wherein the permitting is based on priority of the process.

* * * * *